Oct. 7, 1969          R. H. WHISLER, JR          3,470,986
HYDRAULIC SHOCK ABSORBER AND FLOW CONTROL MEANS THEREFOR
Filed June 29, 1967                    3 Sheets-Sheet 1

INVENTOR.
RALPH H. WHISLER, JR.
BY Myron E. Click
ATTORNEY

INVENTOR.
RALPH H. WHISLER, JR.

BY *Myron E. Click*

ATTORNEY

INVENTOR.
RALPH H. WHISLER, JR.
BY
Myron E. Click
ATTORNEY

United States Patent Office 3,470,986
Patented Oct. 7, 1969

3,470,986
HYDRAULIC SHOCK ABSORBER AND FLOW CONTROL MEANS THEREFOR
Ralph H. Whisler, Jr., Toledo, Ohio, assignor to Oldberg Manufacturing Company, Grand Haven, Mich., a corporation of Michigan
Filed June 29, 1967, Ser. No. 650,068
Int. Cl. F16d 57/00
U.S. Cl. 188—100                                    5 Claims

ABSTRACT OF THE DISCLOSURE

Shock absorber apparatus operable in vertical or horizontal positions or at inclinations from such positions. Hydraulic shock absorbers having a piston and a cylinder relatively reciprocable to displace hydraulic fluid against flow resistance utilize a reservoir for hydraulic fluid that provides a space in communication with the cylinder to receive and return hydraulic fluid displaced from the cylinder. A flow control chamber is incorporated in the shock absorber in flow communication with the cylinder and is maintained completely filled with fluid to prevent unconfined gas in the reservoir from entering the shock absorber cylinder, via the flow control chamber, where such unconfined gas would cause an undesirable lag in the damping effect of the shock absorber.

---

In the conventional type of hydraulic shock absorber, a piston is carried on the end of a reciprocating rod that extends from the shock absorber cylinder, the rod being connected to one part of a movable mass, such as the chassis of a motor vehicle. The piston reciprocates with respect to the cylinder which is in flow connection with a reservoir for hydraulic fluid displacement from the cylinder, the cylinder and reservoir structure usually being connected to another movable mass, such as the running gear of a motor vehicle.

The reservoir of a shock absorber usually serves two purposes, one of which is to provide a supply of hydraulic fluid to the shock absorber cylinder to make up for any loss of fluid that seeps to the outside of the shock absorber. The other function is that of providing a reserve chamber space into which fluid can be displaced from a shock absorber cylinder during a reciprocating motion of the piston within the cylinder of the shock absorber.

In a conventional direct-acting type shock absorber a volume of fluid equal to the displacement of the rod on which the piston is mounted is displaced in the shock absorbed cylinder through suitable resistance valves in the piston and through resistance valves in the base of the cylinder into the reservoir during the compression stroke of the shock absorber. On the rebound stroke, the volume of fluid that was displaced from the shock absorber cylinder during the compression stroke is returned to the shock absorber cylinder through a low resistance valve in the base valve of the cylinder to refill the cylinder. To provide space for the pulsing action of the hydraulic fluid between the shock absorber cylinder and the reservoir, a volume of air has been retained in the reservoir so that the reservoir level could vary with the displacement flow of the hydraulic fluid.

When a shock absorber is inclined from its vertical position, as the shock absorber proceeds towards a horizontal position, the air confined within the reservoir may eventually have direct access through the base valving to the interior of the cylinder. This results in an influx of air into the interior of the cylinder, which air greatly increases the lag on the compression stroke.

It has been proposed in the prior art to provide deformable gas chambers or cells within the shock absorber to retain the hydraulic fluid within the shock absorber under pressure, with a shock absorber being completely filled with hydraulic fluid with the exception of the closed gas chamber or cell. The provision of the deformable gas chambers would then presumably allow the operation of the shock absorber in any disposition whether horizontal, vertical, upside down, etc., since there would be no unconfined air in the reservoir to enter into the cylinder to cause the lag on the compression stroke. However, a problem first occurs in the loss of hydraulic fluid from the shock absorber that occurs over a period of operating time as the result of seepage of the hydraulic fluid along the reciprocating rod that extends into the shock absorber, and secondly, there is a problem of avoiding a harsh ride condition represented by transmission of ripple vibrations from the road to vehicle when absolute hydraulic control is contained in the shock absorber.

It has been found that complete elimination of free air from the shock absorber results in such positive control of piston movement and elimination of lag characteristic that small ripple road vibrations are transmitted to the body of the vehicle producing a ride harshness that is not desirable. There is thus shown in the prior art, in U.S. Patent No. 3,024,875, issued Mar. 13, 1962, a method of introducing a small percentage of free air in the shock absorber in addition to a deformable gas chamber or cell in the reservoir of same to avoid the ride harshness created by true hydraulic control. The amount of free air permitted in the shock absorber according to the above-identified patent to accomplish this result is from 2.5 percent to 4 percent of the total internal volume of the shock absorber and reservoir. According to the teachings of the above patent if the volume of air is less than that set forth, the ride harshness reoccurs and if it is greater than that set forth, the degree of compression lag increases greatly with the feeling of loss of control of compression stroke approaching that of a conventional shock absorber having a large volume of air in the reservoir, which is usually in the neighborhood of 20 percent to 25 percent of the total internal volume of the shock absorber.

However, if such a shock absorber incorporating the features described in the above-identified patent is utilized in a horizontal position or at a declination below a horizontal position the free or unconfined air, even though only between 2.5 percent and 4 percent of the total internal volume of the shock absorber and reservoir, may be drawn into the interior of the cylinder on the extension or rebound stroke of the cylinder, thus causing substantial interference with the proper operation of the shock absorber. Further, even though the shock absorber is designed for use only in the horizontal position under normal circumstances, it is to be noted that quite frequently the shock absorber may be declined below the horizontally chosen position and the base valve end of the cylinder is actually above the piston rod end of the cylinder, permitting the free air to enter the cylinder on an extension stroke. This is true since any horizontal vehicular use of such a shock absorber in either a steering or vibration damping installation may cause the shock absorber to be so tilted because the vehicle is proceeding up or down a hill or on a curve or side of hill approach. Once the air is admitted to the interior of the cylinder the vehicle upon returning to a relatively level surface may have great difficulty in discharging such air from the interior of the cylinder. Thus the shock absorber that utilizes the combination of a deformable gas chamber or cell in the reservoir along with a limited percentage of unconfined or free air may not be operated at any desired angle.

Under normal operating conditions, a shock absorber tends to lose a small volume of oil over the period of its normal life, the oil loss occurring through the rod seal for the device. This then may result in increasing the volume of free air in the shock absorber and thus increasing the possibility of air influx into the cylinder under various conditions of operation.

U.S. Patent No. 2,747,695, issued May 29, 1956, discloses another form of horizontally operable shock absorber. A cylinder filled with fluid is attached to one movable member while a piston rod extending from a piston in the cylinder through a packed opening in the opposite end of the cylinder is attached to another movable member. There is provided within the cylinder at the end which is connected with one of the movable members, a reservoir or expansion chamber containing a certain volume of air above the variable liquid level, and adapted to admit and discharge more or less liquid as the piston rod displaces liquid from the working chamber of the cylinder and permits return flow thereto, as successive portions of the rod enter or leave the cylinder.

This expansion or compensating chamber is separated from the working chamber of the cylinder by a transversely extending partition having openings therethrough which may be valved to throttle the passage of liquid in either or both directions; and provision is made for the arrangement and positioning of these openings so that the shock absorber may function in inclined or horizontal positions without danger of air within the compensation chamber or reservoir passing into the working chamber and causing cavitation and rendering the instrument inoperative. In order to provide more trapped air space and gain the best degree of expansion control, a dome or protuberance is added at the side of the expansion chamber portion of the cylinder, which can contain all of the trapped air in most tilted positions of the shock absorber.

The use of the dome complicates assembly and shipping problems in addition to requiring extra installation room. Fluid seepage may occur along the rod as discussed hereinbefore. The fluid so lost is then replaced by air in the working chamber which interferes with the designed operation of the shock absorber as noted above.

Horizontally operable shock absorbers illustrated in U.S. Patents No. 3,101,131 and No. 3,140,085, and of the same type as the one just discussed have made provision for elimination of the dome and transversely extending partition by utilizing a freely floating piston and a movable diaphragm, respectively, both of which are impervious to air contained in an expansion chamber at the end of the cylinder attached to a movable mass. These shock absorbers are subject to the fluid loss problem, however, and may not be primed out since no air can be transferred from the working chamber to the expansion chamber.

It is, accordingly, an object of this invention to provide a new and improved shock absorber or damping apparatus.

It is a further object of this invention to provide a new and improved hydraulic shock absorber or damping apparatus which may be operated in vertical or horizontal or various other angles of inclination or declination without a loss of operating efficiency.

It is a still further object of this invention to provide an improved shock absorber or damping apparatus which is operable at various angles of installation, the expense of manufacturing said shock absorber or damping apparatus being less than that encountered heretofore for attempts to manufacture horizontally operable shock absorbers.

Another object of this invention is to provide an improved shock absorber or damping apparatus which may be operable in various degrees of inclination or declination in which the harshness of absolute hydraulic control is avoided.

In order to carry out the above objects the invention features shock absorber or damping apparatus which is adapted for use in horizontal or vertical positions and comprises a cylinder structure and a piston structure relatively reciprocable for displacement of hydraulic fluid against flow resistance. A flow control chamber is provided in flow communication with the cylinder structure. An expansion chamber having an unconfined volume of free gas therein is provided along with means for directing fluid from said flow control chamber into and out of said expansion chamber in response to displacement and return of fluid between the cylinder and the flow control chamber. Means are provided for keeping the flow control chamber completely filled with fluid at all times without regard of the angle of disposition of the shock absorber, thereby preventing the unconfined or free gas in the expansion chamber from entering the cylinder structure. The fluid directing means may comprise a fluid exchange conduit between the flow control and expansion chambers, the conduit having ends opening into the respective flow control and expansion chambers. The means for keeping the flow control chamber completely filled may comprise locating the end of the conduit opening into the expansion chamber below the surface of fluid in the expansion chamber. The expansion chamber may comprise a second cylinder structure surrounding the first-mentioned cylinder structure. The conduit end opening into the expansion chamber may be located approximately midway along the length of the expansion chamber. The expansion chamber is maintained more than half full of fluid thereby insuring that the conduit end opening into the expansion chamber may be maintained below the fluid level regardless of the angle of disposition of the shock absorber.

The fluid directing means may further comprise an inlet means between the flow control chamber and the expansion chamber. The inlet means is then located beneath the surface of fluid in the expansion chamber and include a first check valve means operative to pass fluid only from the expansion chamber to the flow control chamber. The fluid directing means then may also provide an outlet means from the flow control chamber which includes second check valve means operative to pass fluid or gas only from the flow control to the expansion chamber.

In the specific embodiments disclosed herein there is shown a hydraulic shock absorber including a cylinder tube having a piston therein attached at one end of a piston rod, the rod extending exteriorly of the shock absorber through a seal chamber containing a rod seal member at one end of the cylinder tube. A reservoir tube is provided surrounding the cylinder tube and having an end closure member closing the same and also closing the exteriorly positioned end of the seal chamber through which the rod extends exteriorly of the shock absorber for mounting attachment to a device. The reservoir tube contains a hydraulic fluid supply for the cylinder and a predetermined volume of free or unconfined gas. Partition means are provided in the reservoir tube defining a flow control chamber in flow communication with the cylinder tube and filled with fluid and an expansion chamber containing the unconfined or free gas. Means are provided for directing the fluid in the flow control chamber into and out of the expansion chamber while preventing the gas in the expansion chamber from entering the flow control chamber. In one embodiment shown herein a quantity of the fluid is also contained in the expansion chamber along with the free gas and in this embodiment the fluid directing means may comprise a fluid exchange port formed in the partition means and located beneath the surface of the fluid in the expansion chamber. This first embodiment may further include a first check valve means in the fluid exchange port to allow flow only from the expansion chamber to the flow control chamber and exhaust port means formed in the partition means having second check valve means disposed therein to permit flow only from the flow control chamber to the expansion chamber. The exhaust port means is preferably formed in the partition means to communicate with a gas collecting pocket in the flow control chamber to permit expulsion of inadvertently introduced gas from the flow control chamber.

Other objects, advantages and features of this invention will become apparent when the following description is taken in conjunction with the accompanying drawings, in which.

Figure 1:
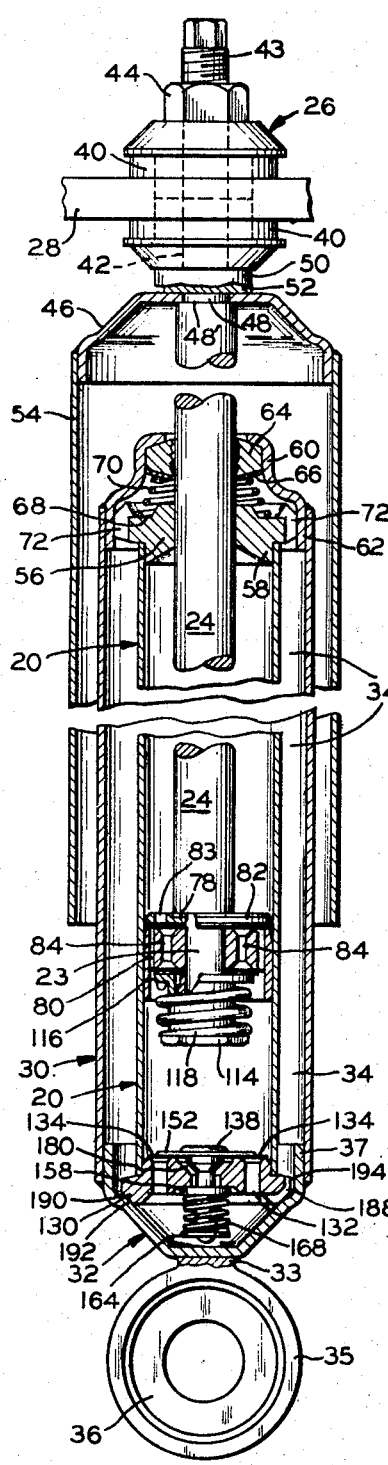
FIGURE 1 is a longitudinal sectional view through the shock absorber which may be used to embody the features of the invention.
Figure 3:
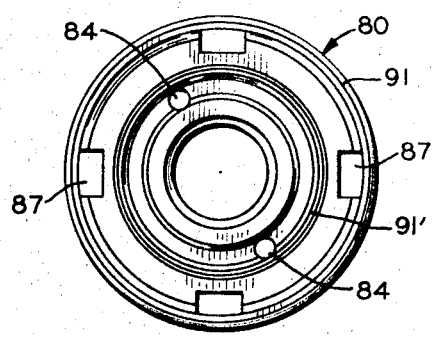
FIGURE 3 is a top plan view of the piston body showing the flow passages therein.

Referring to the drawings in detail and initially to FIGURE 1, the shock absorber is inclusive of a tubular member 20 providing a working cylinder in which is slidably disposed a piston and piston valve construction or assembly 22 secured on a tenon 23 or portion of reduced diameter formed at the lower end of a piston rod 24, the upper end of the piston rod being provided with a mounting construction 26 adapted to be secured to a member or bracket 28 carried by the frame construction of the vehicle with which the shock absorber may be used. The working cylinder 20 is surrounded by a second tubular member or cylinder 30 concentric therewith which, with an end cap 32, forms a liquid reserve chamber or reservoir 34.

While the tubular members or cylinders disclosed herein are shown as having circular cross-sections, it is to be noted that other cross-sections are acceptable if the functions described may be attained. For example, the periphery of the piston must match the cross-section of the interior surface of the working cylinder.

Welded as at 33 to the end cap 32 is a lower mounting fixture 35 in which is disposed a grommet or bushing 36 having an opening therethrough to accommodate a member (not shown) secured to a vehicle axle or other vehicle wheel supporting means of conventional construction. The cap 32 is fashioned with a circular peripheral flange 37 which is welded throughout its periphery to the lower end region of the tube or cylinder 30.

The upper mounting 26 may comprise two bushings 40 adapted to surround a mounting stud 42 welded to a tenon 48 on the piston rod 24, the bushings extending into a mounting bracket or frame member 28, the shoulder portions of the bushings engaging the upper and lower surfaces of the mounting bracket or frame member. A portion of the stud 42 is threaded as at 43 to accommodate a nut 44 for securing the bushings 40 to the mounting member. Telescoped on the tenon 48 is an upper cap 46 which engages a shoulder 48' at the junction of the tenon 48 with the rod body 24. The enlarged head of the stud 42 is resistance welded as at 52 to the tenon 48, the weld 52 securing the cap 46 against the rod shoulder 48'.

Surrounding a peripheral region of the cap 46 is a third cylindrical member or sleeve 54 which is welded to the cap 46 and is concentric with the cylinder 30. The sleeve 54 provides a guard to prevent damage to the piston rod by flying stones or debris.

The upper adjacent end regions of the working cylinder 20 and the second cylinder 30 are adapted to be closed by suitable means to confine the liquid within the working cylinder 20 and the reservoir chamber 34. The upper end of the working cylinder 20 is provided with a closure in the form of a bushing 56, slidably accommodating the piston rod 24, the bushing 56 having an extension or tenon 58 snugly fitted into the upper end region of the working cylinder 20.

Disposed at the upper end of the cylinder 30 is a cap member 60 having a peripheral flange portion 62 welded to the end region of the cylinder 30 so as to form a fluid tight joint between the mmeber 60 and the cylinder 30. Disposed within the cap member 60 is a packing gland or seal 64 of suitable material configurated to prevent leakage of fluid along the piston rod 24. Disposed contiguous with the lower surface of the gland 64 is a metal washer 66 and positioned between the washer 66 and an annular recess 68 formed in the rod guide bushing 56 is an expansive coil spring 70.

The spring 70 biases the packing gland 64 into sealing engagement with the surface of the piston rod 24. The rod guide bushing or member 56 is fashioned with peripherally arranged spaced notches 72 providing drain channels facilitating the return of fluid, which seeps between the piston rod 24 and the guide bushing 56, from the seal chamber formed by cap 60 and the rod guide bushing 56 to the reserve chamber or reservoir 34. Through this arrangement there is no loss of liquid and minute leakage along the rod 24 at the region of the bushing 56 prevents the region of the working cylinder above the piston from becoming air bound.

The piston and piston valve construction is illustrated particularly in FIGURES 2 through 5. Snugly telescoped onto the tenon 23 of the piston rod is a piston or piston body 80 preferably formed of sintered iron molded or pressed to the desired shape. Disposed adjacent the shoulder 78 between the rod body and tenon 23 is a backing plate or abutment plate 82. The abutment plate 82 is provided with a plurality of circumferentially spaced passages or openings 83, for example, five or six openings being preferred.

The piston 80 is fashioned with a plurality of circumferentially arranged spaced passages or channels 84. In the embodiment illustrated, two passages 84 are fashioned in the piston, but it is to be understood that a greater or lesser number may be used, depending upon the freedom or restriction of fluid flow desired. The piston is fashioned with a depending skirt 85 to provide an elongated bearing area for the piston. Disposed adjacent the upper surface of the piston is a disc-like inlet valve 86.

Figure 5:
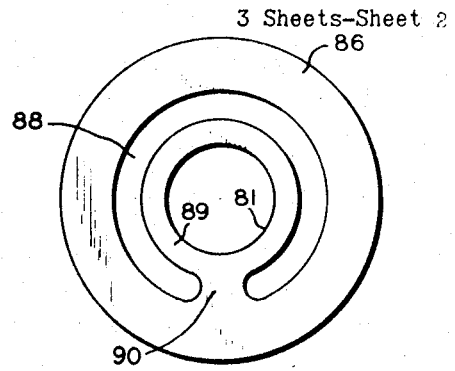
FIGURE 5 is a plan view of an inlet valve of the piston assembly.

The valve 86 is shown in FIGURE 5 and is preferably of a thickness of between seven thousandths and twelve thousandths of an inch. The valve 86 is formed with a central opening 81 to accommodate the tenon 23 of the piston rod. The disc valve 86 is formed with a partial annular slot 88 defining a hub portion 89, the unslotted portion providing a connecting portion or bridge 90 as shown in FIGURE 5. Through this construction of inlet valve, the peripheral region of the valve may be flexed even though the central hub portion 89 is securely held against flexure.

The peripheral region of the disc valve 86 engages a circular seat provided by the upper peripheral edge 91 of the sleeve portion 85 of the piston and a second circular seat provided by a circular ridge 91' concentric with the circular seat 91. The disc valve 86 is resiliently biased toward its seating or closed position by a star-shaped resilient plate or spring 92 having a hub portion 93 positioned between the disc valve 86 and the abutment plate 82. The resilient means 92 is fashioned with a plurality of radially extending fingers 94, preferably six fingers which engage the disc valve 86, as shown in FIGURE 2.

The abutment plate 82 is fashioned with an annular recess 96 providing clearance space into which the fingers 94 of the spring 92 are flexed when hydraulic pressure developed beneath the piston moves the disc valve 86 from its seat to facilitate flow of liquid into the region above the piston. The backing plate 82 is of a diameter slightly less than the interior diameter of the working cylinder 20 providing an annular passage 98 to facilitate upward flow of liquid when the valve 86 is flexed to open position.

The piston assembly is inclusive of a rebound valve arrangement for facilitating fluid flow from the rod region of the working cylinder into the region beneath or on the base valve or other side of the piston. As shown in FIGURE 2, a rebound disc valve 102 is disposed beneath the lower surface of the piston 80.

Figure 2:
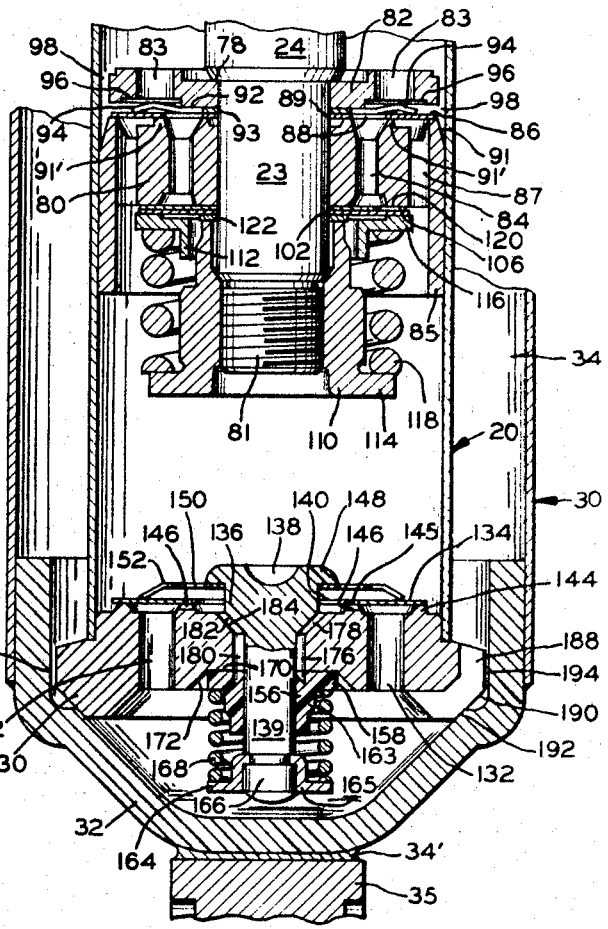
FIGURE 2 is an enlarged longitudinal sectional view of a portion of the shock absorber shown in FIGURE 1 illustrating the piston and base valve constructions.
Figure 4:
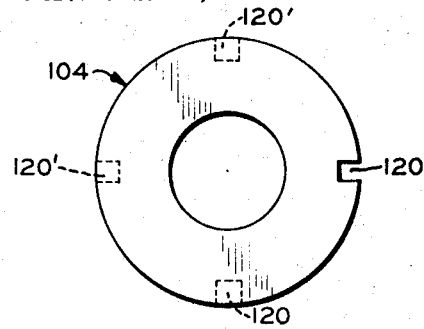
FIGURE 4 is a plan view of a flow metering disc forming a component of the piston valve assembly.

A metering disc 104, shown in FIGURES 2 and 4, is disposed between the piston 80 and the disc valve 102. The peripheral region of the metering disc 104 seats against a circular ridge 106 formed on the piston 80. The disc valve 102 is of annular shape having a central opening to accommodate the tenon 23 of the piston rod.

Threaded upon a threaded portion 81 of the tenon 23 is a piston nut 110. Surrounding the upper portion of the nut 110 is an annular member or spring retainer 112. Disposed between a flange 114 formed on the nut 110 and the flange portion 116 of the member 112 is a comparatively strong expansive coil spring 118. The respective ends of the spring are fashioned with flat portions so as to properly seat against the flange 114 on the nut and the flange 116 on the annular member. The flange 116 of the annular member 112 engages the rebound disc valve 102. The expansive pressure of the spring 118 holds the rebound disc valve in closed position and the metering disc 104 in engaging relation with the circular seat 106 on the piston.

The metering disc 104, as shown in FIGURE 4, is provided with one or more metering notches or passages depending upon the size of a permanent bleed passage means desired to facilitate desired flow of liquid from one face to the other, the rate of flow being dependent upon the number and size of the metering notches. In the metering disc shown in FIGURE 4, one passage or notch 120 is provided but, as shown in broken lines, one or more additional openings 120' may be provided, if desired.

The purpose of the permanent bleed passage means, provided by one or more openings 120 or 120' is to offer fixed flow resistance to minor relative movements between the piston and the working cylinder such as may be caused by slight road irregularities. Disposed between the upper end of the nut 110 and the disc valve 102 is an annular washer 122 to enable drawing up the nut 110 without damaging the disc valve 102.

Sufficient clearance is provided between the nut 110 and the annular member 112 to facilitate movement of the retainer 112 with respect to the nut 110 when the disc valve 102 and the metering disc 104 are flexed by fluid pressures developed in the working cylinder above the piston to effect flow of liquid from the rod end of the piston to the region beneath the piston. The paths of liquid flow on compression and rebound strokes of the shock absorber will be hereinafter described.

The base valve or foot valve construction of the invention and components thereof are particularly shown in FIGURES 2 and 6 through 11. The base valve construction includes a valve plate or body 130 particularly shown in FIGURES 2 and 6 through 8. The body is formed with a plurality of circumferentially spaced openings 132, each being of substantial area, there being six openings in the embodiment illustrated. The size and number of the openings is such as to accommodate passage of substantial volume of liquid on the rebound or extension stroke of the piston rod with a minimum of flow resistance.

The base or foot valve construction is provided with two valve means, a first valve means being mounted above the body 130 for the purpose of admitting flow of liquid from the reserve chamber or reservoir 34 into the working cylinder into the region between the piston and base valve, the second valve means being arranged at the opposite or lower side of the body 130. The first valve means comprises a disc valve 134 which has a central opening accommodating an enlarged portion 136 of a rivet 138.

Figure 9:
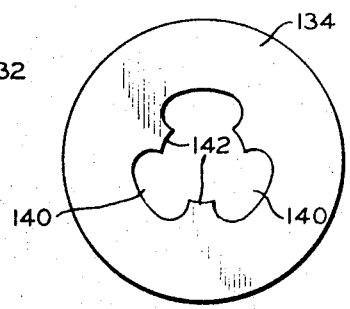
FIGURE 9 is a plan view of a replenishing valve member of the base valve construction.

As shown in FIGURE 9, the disc valve 134 is fashioned with a plurality of generally segment-shaped open areas 140 defined by radially-disposed inwardly-extending tabs or lugs 142, the lugs engaging spaced regions of the enlarged portion 136 of the rivet to center the disc valve 134. The body 130, preferably made of sintered iron, is fashioned with two concentric circular ridges or raised portions 144 and 145, shown in FIGURE 6, which form seats for the disc valve 134. The head of the rivet provides an outwardly extending flange or ledge 148.

Figure 11:
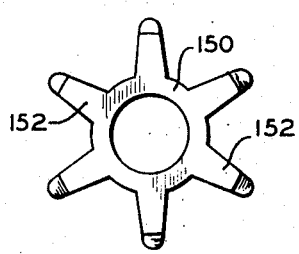
FIGURE 11 is a plan view of a biasing finger spring for controlling the replenishing valve of the base valve construction.

Disposed between the disc valve 134 and the ledge or flange 148 of the rivet 138 is a resilient member or plate spring 150 having an annular central hub received on the enlarged portion 136 of the rivet and seating on the ledge 148. The spring 150, shown in FIGURE 11, is fashioned with a plurality of radially arranged resilient fingers 152 biasing the disc valve 134 toward closed position in engagement with the circular seats 144 and 145.

The spaces between the radially arranged fingers 152 of the spring 150 together with the segment-shaped passages or openings 140 in the disc valve 134 provide for fluid flow through valve disc 134 under conditions hereinafter explained.

Figure 6:
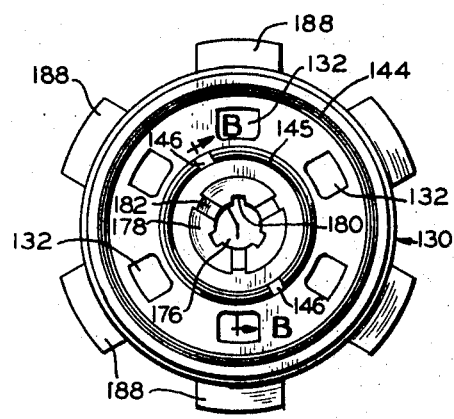
FIGURE 6 is a top plan view of the base valve body.

The inner circular valve seat 145 is usually provided with one or more small notches 146, as shown in FIGURE 6, to provide restricted passage means open at all times irrespective of the position of the valve 134 to facilitate restricted flow of fluid out of the working cylinder during the compression stroke as successive portions of the piston rod enter the working cylinder and prior to unseating of a sleeve "blow-off" valve hereinafter described. The notch or notches 146 may be of a number and of a size to obtain a desired restriction to meter flow of liquid through the passage means there being two diametrically arranged notches in the embodiment illustrated.

A second valve means is associated with the body 130 and the rivet 138 for facilitating controlled flow of liquid from the region of the working chamber beneath the piston assembly and through the base valve construction during the compression stroke as successive portions of the piston rod enter the working cylinder 20 at higher velocities than previously described and acts as a "blow-off" valve to relieve predetermined high fluid pressures. As particularly shown in FIGURE 2, the shank 139 of the rivet 138 is of smooth cylindrical shape and surrounding the shank is a valve member 156 of sleeve-like construction which is slidable along the shank of the rivet.

Figure 10:
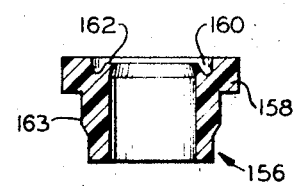
FIGURE 10 is an enlarged detail sectional view illustrating a high pressure relief valve fashioned of non-metallic material.

The sleeve-like valve member 156 is preferably fashioned of nonmetallic material, such as resinous plastic, which may be a polyamide resin (nylon) preferably glass fiber reinforced. The normal configuration of the sleeve-like valve 156 is shown in FIGURE 10 and includes an outwardly extending flange portion 158, a circular recess 160 which provides a lip portion 162 and a thickened portion 163 to center the end of spring 168 and reinforce the flange 158.

The sleeve valve 156 is molded in a manner whereby the lip portion 162 extends a slight distance inwardly of the bore in the valve whereby, in assembly, the lip portion 162 is stretched or tensioned in snug engagement with the shank 139 of the rivet 138. The lip portion 162, by reason of its reduced cross-section, is flexible and engages the shank of the rivet to prevent leakage of liquid between the rivet and the sleeve valve 156. Furthermore, pressure of liquid established by a compression stroke, acting on the lip portion 162 forces or compresses the lip portion 162 tightly against the shank of the rivet to establish a positive leakproof seal.

Secured to the rivet 139 is an abutment washer or member 164 having a hub portion 165 fitted onto a reduced portion of the shank 139 of the rivet. After assembly, the end of the rivet is swaged into the cup-like recess of the member 164 to form an expanded portion 166, as shown in FIGURE 2.

Disposed between the washer 164 and the flange 158 of the sleeve-like valve 156 is a comparatively strong expansive coil spring 168 which abuts against the washer 164 and normally biases the valve 156 to closed position wherein the flange 158 snugly seats against an annular surface 170 formed on the body 130.

Figure 8:
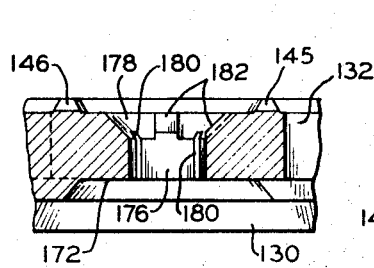
FIGURE 8 is an enlarged detail sectional view taken substantially on the line B—B of FIGURE 6.

The body 130 is fashioned with a recess 172 defining the surface 170 to accommodate the flange portion 158 of the sleeve valve 156 and provide a compact construction. The body 130 is fashioned with a bore 176 in communication with conically-shaped recessed regions 178, as shown in FIGURES 6 and 8. The bore 176, in the embodiment illustrated, is formed with three circumferentially spaced notches 180 providing metering passageways along the shank 139 of the rivet.

The notches 180 may be of a depth and width to secure the desired metering of liquid flow from the region above the base valve to the reserve chamber during "blow-off" viz, when the sleeve valve 156 is opened as successive increments of piston rod 24 entering working cylinder 20 and of necessity displace an equivalent volume of working fluid from that cylinder during the compression stroke, particularly during high velocity piston rod movement. Thus the metering of liquid flow through the base valve construction on compression strokes is provided by the combined area of the notches 180. The conically-shaped spaced recessed regions 180 define spaced lands 182 which form abutment means engagable with the region 184 of the rivet 138 to position the flange 148 thereof a desired distance above the valve body 130.

Figure 7:
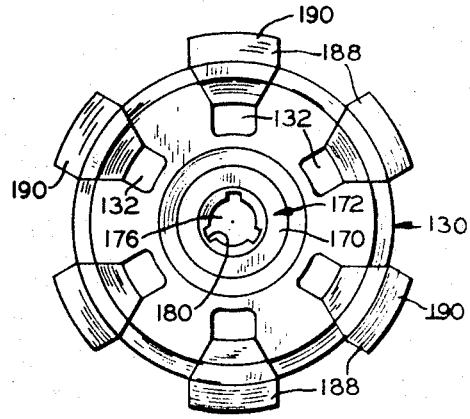
FIGURE 7 is a bottom plan view of the base valve body.

The valve body 130 is fashioned with a plurality of outward extending circumferentially spaced lugs 188, as shown in FIGURES 2, 6 and 7, having angular surfaces 190 which engage a frusto-conical surface 192 interiorly of the cap member 32, as shown in FIGURE 2. The peripheral surface regions of the lugs 188 are of slightly lesser dimension than the diameter of the interior cylindrical surface of the cap 32 providing slight clearance spaces 194, as shown in FIGURE 2.

In assembly, the angular or cone-shaped surfaces 190 of the circumferentially spaced lugs 188 engage the angular or cone-shaped surface 192 to further center the foot valve assembly and the cylinder 20 with respect to the cap 32.

The operation of the shock absorber assembly as described above is as follows: During small or minor movements of the piston assembly relative to the working cylinder caused by slight road irregularities, fluid flow occurs in either direction through one or more notches in the metering disc 104 and through the notches or passageways 146 formed in the circular ridge 145 of the body 130 of the base valve construction whereby predetermined resistance is offered to low velocity relative movement of the piston and working cylinder.

Upon the vehicle wheel encountering a substantial obstruction in the roadway, and the vehicle wheel being forced upwardly, the fluid within the working cylinder is instantly subjected to high compression forces as successive increments of the piston rod are forced into the working cylinder. At the same time, fluid between the base valve and the piston is forced through the piston assembly through passages 87 formed in the piston body 80, the hydraulic pressure causing the disc valve 86 which is shown in FIGURE 2 in closed position to be flexed to open position to permit passage of fluid past the valve seat 91 and through the annular space surrounding the abutment plate 82 into the piston rod end of the working cylinder.

In reference to the base valve assembly, the high hydraulic pressure acts upon the sleeve valve 156 to compress the spring 168, sliding the valve along the shank 139 of the rivet to open position whereby liquid flows from the working cylinder into the reserve chamber 34 by way of the metering passages 180 adjacent the shank of the rivet 138 past the flange 158 of the valve 156 through the spaces between adjacent lugs 188 into the reserve chamber 34.

The force of the spring 168 biasing the sleeve valve 156 toward closed position is comparatively strong, requiring comparatively high fluid pressure within the working cylinder to unseat this valve and permit return to the reserve chamber of fluid in excess of the quantity of fluid which flows into the rod end of the working cylinder through the piston compression passages 87, the disc valve 86 being open sufficiently to facilitate rapid flow of fluid into the rod end of the working cylinder.

Through this valve arrangement, substantial resistance to flow of liquid past the "blow-off" valve 156 into the reserve chamber is provided. The valve 156 provides a controlled "blow-off" or pressure relief means so as to provide substantial resistance to relative movement of the piston and base valve assemblies toward each other on compression strokes and to assure proper transfer of fluid into the rod end of the cylinder.

The flow paths of the fluid on a rebound or extension stroke as separation movement between the piston and the base valve occurs is as follows: As successive portions of the piston rod are withdrawn from the working cylinder and the volume within the working cylinder increases, fluid flow through the piston assembly takes place through the passages 83 in the abutment plate 82, through the circular slot 88 in the disc valve 86 and through the passages 84 in the piston body.

The hydraulic pressure in the rod end of the working cylinder builds up to an extent compressing the comparatively strong spring 118 by flexing the disc valve 102 and the metering disc 104 downwardly, thereby effecting flow of fluid past the valve seat 106 on the piston body 80 into the region between the piston assembly and the base valve assembly.

As the volume of the region in the working cylinder increases as the piston assembly and base valve assembly are moved away from each other on a rebound stroke, liquid from the reserve chamber 34 flows through the spaces between lugs 188 through the passages 132 in the base valve body 130, opening the disc replenishing valve 134 which is moved upwardly facilitating flow of fluid past the circular valve seats 144 and 145 to fill the enlarging volume in the working cylinder by liquid from the reserve chamber.

The above described paths of travel or transfer of the liquid into and away from the working cylinder through the base valve construction and into and away from the rod end region of the working cylinder are repeated during every compression stroke and rebound stroke of sufficient magnitude to cause the opening or closing of the several valves in the manner above described. The pressure at which the disc valve 102 is opened to effect fluid flow through the piston passages 84 may be varied by employing a spring 118 of lesser or greater strength to thereby regulate the biasing force to be overcome by the pressure in the rod end of the working cylinder.

The pressure at which the "blow-off" valve 156 is opened may be controlled by employing a spring 168 of different expansive force. A liquid is employed in the shock absorber which is of substantially constant viscosity throughout the normal temperature range encountered in the use of shock absorbers whereby the flow of the liquid through the valved passages is only slightly affected by temperature changes so that satisfactory operation of the shock absorber irrespective of ambient temperature variations is attained.

While one particular internal construction of the shock absorber has been illustrated and described herein, it will be apparent to those skilled in the art that various types of shock absorber constructions can be incorporated in this invention without departing from the scope of the invention.

As noted in the discussion hereinbefore when a shock absorber, containing an unconfined or free volume of gas in the reservoir chamber 34, is declined to or below a horizontal disposition the free or unconfined air may enter the working cylinder 20 via the base valve means 130, undesirably interfering with the proper operation of the shock absorber or damping apparatus. However, as noted it is desirable to have a volume of free gas in the reservoir.

In order to prevent the entrance of the free gas into the working cylinder 20 a partition means generally designated at 280 has been provided in the reservoir 34 and includes a tube 281, a static seal gasket 282 and a gasket retaining groove 284 circumferentially formed in the tube 281. The partition 280 defines in the reservoir or reserve chamber 34 a flow control chamber 255a which is in flow communication with the working cylinder 20 and which is maintained completely filled with fluid at all times, and an expansion chamber 255b which contains the free or unconfined gas. Means are provided for directing the fluid in the flow control chamber 255a into and out of the expansion chamber 255b while preventing the gas in the expansion chamber 255b from entering the flow control chamber and thus from entering the working cylinder 20.

Figures 12, 13:
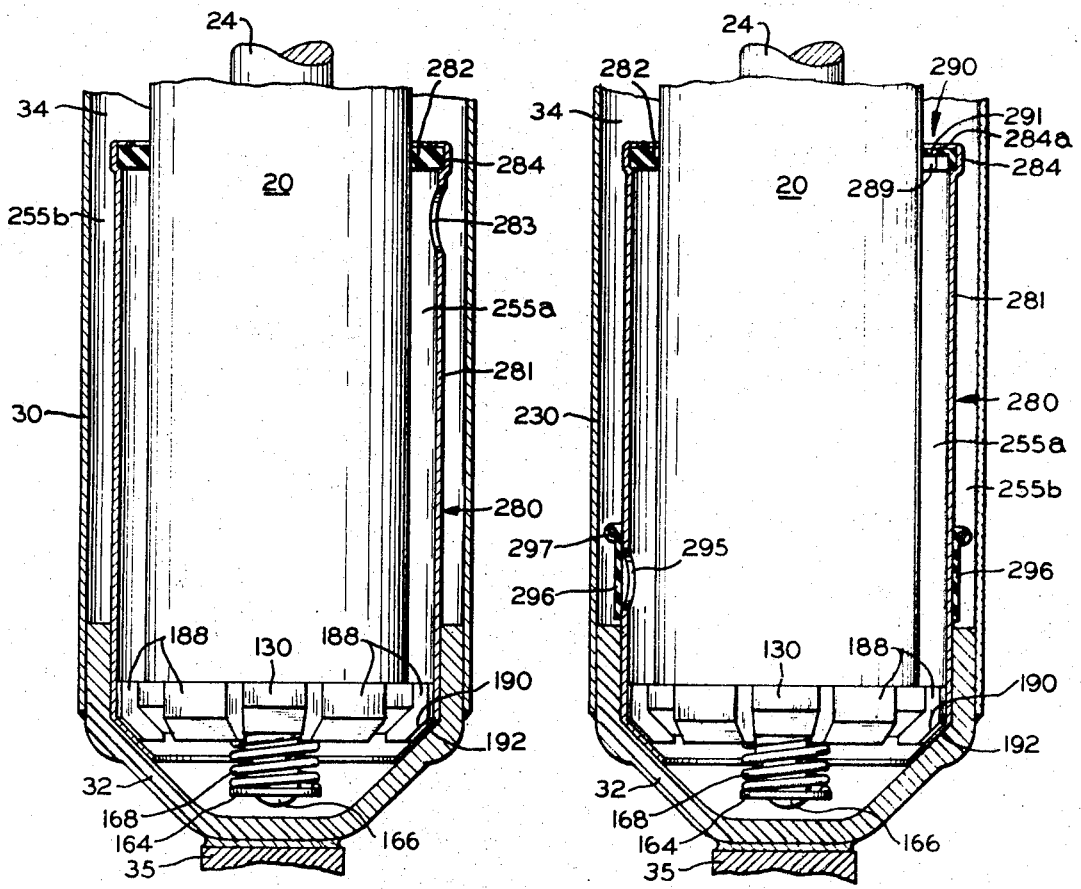
FIGURE 12 is a longitudinal cross-sectional view of a shock absorber or damping apparatus which embodies the teachings of this invention.
FIGURE 13 is a longitudinal cross-sectional view of a portion of a shock absorber showing a second embodiment of the teachings of this invention.

In the embodiment illustrated in FIGURE 12 the fluid directing means comprises a fluid exchange port 283 formed in the partition means 280 and located, when the shock absorber is in the horizontal or either vertical position, beneath the surface of fluid in the expansion chamber 255b. In this embodiment a quantity of fluid is also contained in the expansion chamber 255b along with the unconfined volume of free gas. Since the fluid exchange port 283 is located beneath the surface of the fluid in the expansion chamber 255b the unconfined gas cannot enter the flow control chamber 255a.

In the embodiment illustrated in FIGURE 12 the partition means or the flow control chamber is a cylindrical tube surrounding the working cylinder 20, preferably concentrically located with respect thereto for easier fabrication, and extending over half the length of the reservoir tube 30. The base valve end of the tube 281 is provided with frusto-conical walls to match the similarly formed surfaces 192 of the end cap 32 and 190 of the lugs 188 to provide a seal and a seat, respectively. By providing a flow control chamber tube 281 of this length the fluid exchange port 283 may be formed in the tube 281 at a position half way along, or at the midpoint of, the reservoir tube 30. Therefore if the reservoir tube 30 is supplied with sufficient fluid so that the level of the fluid is always above a half full mark in the reservoir chamber regardless of the extension or compression of the piston 80, it can be seen that without regard to whether the shock absorber is placed in a vertical or horizontal position, or inclined or declined from either position, that the fluid exchange port 283 will always communicate with fluid in the expansion chamber 255b and will remain below the surface thereof. The outside of the shock absorber should be marked so that it is never mounted with the fluid exchange port 283 facing upwardly.

It should be noted that flow communication between the flow control chamber 255a and the expansion chamber 225b may be maintained by a more complex flow exchange conduit rather than the simple port 283, if desired. However, the port 283 may be defined as a flow exchange conduit which has one end opening into the flow control chamber 255a and the other end opening into the expansion chamber 255b to effect the flow communication required. As long as the end of the flow exchange conduit opening into the expansion chamber 255b is below the surface of the fluid in expansion chamber 255b the unconfined air or gas in expansion chamber 255b may not enter the flow control chamber 255a or the working cylinder 20.

Figure 14:
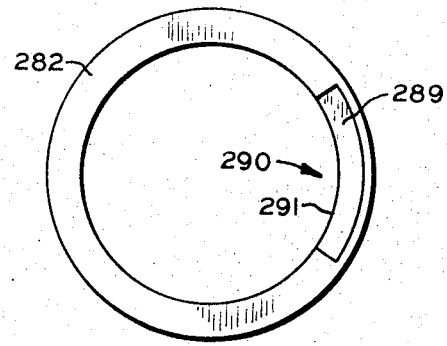
FIGURE 14 is a side view of a gasket and check valve element which is utilized in the apparatus shown in FIGURE 13.

Referring to FIGURES 13 and 14 there is illustrated an alternative arrangement of the flow control chamber 255a and the expansion chamber 255b. A fluid exchanger port 283 is not provided in the tube 281, but an inlet means comprising an inlet opening 289 formed in gasket 282 and having a check valve 290 therein which includes a flap 291 of gasket 282 is provided. The tube 281 has a circumferentially extending recess 284 formed therein to receive and maintain in position the gasket 282. The inwardly extending flange 284a of the circumferentially formed recess 284 provides a backing or stop means for the flap 291 so that the flap is deformable inwardly towards flow control chamber 255a to admit fluid from expansion chamber 255b, but is not readily deformable outwardly to permit fluid exchange in the opposite direction because of the stop action of the flange 284a against flap 291.

In order to provide an outlet means for fluid from the flow control chamber 255a into the expansion chamber 255b an exhaust port 295 is formed in the tube 281. A second check valve means including a flapper member 296 and a spring biasing member 297 prevents the entrance of air from the expansion chamber 255b into the flow control chamber 255a. However, internal pressure in the flow control chamber 255a will cause the flap 296 to raise allowing fluid and/or inadvertently introduced gas from the chamber 255a to flow into expansion chamber 255b.

As shown in FIGURE 13, assuming a horizontal disposition of the shock absorber apparatus, the exhaust port 295 is in communication with the highest portion of the cylindrical tube 281. The upper portion of the cylindrical tube 281 thus forms a gas-trapping pocket which is in communication with the exhaust port 295 and allows the expulsion of gas that may be inadvertently introduced into the flow control chamber 255a. Although in actual practice the upper side of the reservoir cylinder will be marked "this side up" it will be possible for one installing the shock absorber in a horizontal position to deliberately turn the portion of the shock absorber marked "this side up" so that it is down and introduce air into the flow control chamber 255a. If, after the air were inadvertently introduced into chamber 255a, the shock absorber were turned and installed in the correct position, as noted by the markings on the outside, the two check valve arrangements illustrated herein would allow the shock absorber to prime itself and after a predetermined number of operations rid the flow control chamber 255a of air therein, permitting normal operation thereafter.

Although the partition 280 has been shown in the form of a concentrically located tube 281-gasket 282 arrangement other partition forms are within the scope of this invention.

In conclusion, it is to be noted that the embodiments disclosed and described herein are meant to be illustrative only and not limiting in any sense. The embodiments described serve merely to illustrate the spirit and scope of the invention.

I claim:

1. A hydraulic shock absorber including a cylinder tube having a piston therein attached at one end of a piston rod, said rod extending exteriorly of the shock absorber at one end of said cylinder tube, a supply of hydraulic fluid, a portion of said supply completely filling the part of said cylinder tube not occupied by said piston and rod, a reservoir tube surrounding said cylinder tube and having an end closure member closing the same through which said rod extends exteriorly of the shock absorber for mounting attachment to a device, said reservoir containing the remainder of said hydraulic fluid supply and a predetermined volume of free gas, partition means in said reservoir tube defining a flow control chamber in flow communication with said cylinder tube and filled with fluid and an expansion chamber containing the remainder of said reservoir fluid and said free gas, and fluid exchange port means formed in said partition means and located below the level of fluid in said expansion chamber for directing said fluid in said flow control chamber into and out of said expansion chamber while preventing said gas in said expansion chamber from entering said flow control chamber.

2. A hydraulic shock absorber comprising a working cylinder and a piston structure relatively reciprocable for displacement of hydraulic fluid against flow resistance, a supply of hydraulic fluid, a portion of said supply completely filling the part of said working cylinder not occupied by said piston structure, a reserve cylinder structure surrounding said working cylinder forming a reserve chamber for containing the remainder of said supply of hydraulic fluid, partition means forming a flow control chamber and an expansion chamber in said reserve cylinder, said flow control chamber being in flow communication with said working cylinder and filled with said hydraulic fluid, said expansion chamber having a reserve of said hydraulic fluid and an unconfined volume of gas therein, and fluid exchange conduit means for directing fluid from said flow control chamber into and out of said expansion chamber in response to displacement and return of fluid between said working cylinder and said flow control chamber, said fluid exchange conduit means including a conduit having ends opening into said respective flow control and expansion chambers, the end of said conduit opening into said expansion chamber being located below the surface of fluid in said expansion chamber whether the shock absorber is disposed vertically or horizontally to prevent said unconfined gas in said expansion chamber from entering said working cylinder through said flow control chamber.

3. A shock absorber as defined in claim 2 in which said conduit end opening into said expansion chamber is located approximately midway along the length of said reserve chamber, the supply of fluid in said reserve chamber being sufficient to occupy more than half the length of said reserve chamber thereby permitting the shock absorber to be operated at any angle of disposition.

4. A hydraulic shock absorber including a cylinder tube having a piston therein attached at one end of a piston rod, said rod extending exteriorly of the shock absorber through a seal chamber containing a rod seal member at one end of said cylinder tube, a supply of hydraulic fluid, a portion of said supply completely filling the part of said cylinder tube not occupied by said piston and rod, a reservoir tube surrounding said cylinder tube and having an end closure member closing the same and also closing the exteriorly positioned end of said seal chamber and through which said rod extends exteriorly of the shock absorber for mounting attachment to a device, said reservoir tube containing the remainder of said hydraulic fluid supply and a predetermined volume of unconfined gas, and a flow control chamber within said reservoir tube in flow communication with said cylinder tube, said flow control chamber being completely filled with said fluid, said flow control chamber having fluid exchange port means formed therein communicating with said reservoir tube and located below the level of fluid in said reservoir whether the shock absorber is disposed horizontally or in either vertical position for keeping said flow control chamber filled with fluid to prevent said unconfined gas from entering said cylinder tube.

5. A shock absorber as defined in claim 4 in which said flow control chamber is a tube surrounding said cylinder tube and extending more than half the length of said reservoir tube and in which said fluid exchange port is formed at approximately the midpoint of said reservoir tube, the supply of fluid in said reservoir tube always being more than sufficient to maintain a surface level above said fluid exchange port in either vertical position.

References Cited

UNITED STATES PATENTS

| | | |
|---|---|---|
| 1,855,064 | 4/1932 | Messier. |
| 2,379,750 | 7/1945 | Rossman. |
| 2,436,901 | 3/1948 | Rossman. |
| 2,498,802 | 2/1950 | Funkhouser. |
| 2,780,321 | 2/1957 | Sturari _____ 188—100 X |

FOREIGN PATENTS

| | | |
|---|---|---|
| 1,264,722 | 5/1961 | France. |
| 771,899 | 4/1957 | Great Britain. |

GEORGE E. A. HALVOSA, Primary Examiner